Nov. 11, 1958 G. B. HILL 2,859,687
AUTOMATIC WIRE TYING MECHANISM
Filed April 15, 1954 6 Sheets-Sheet 2
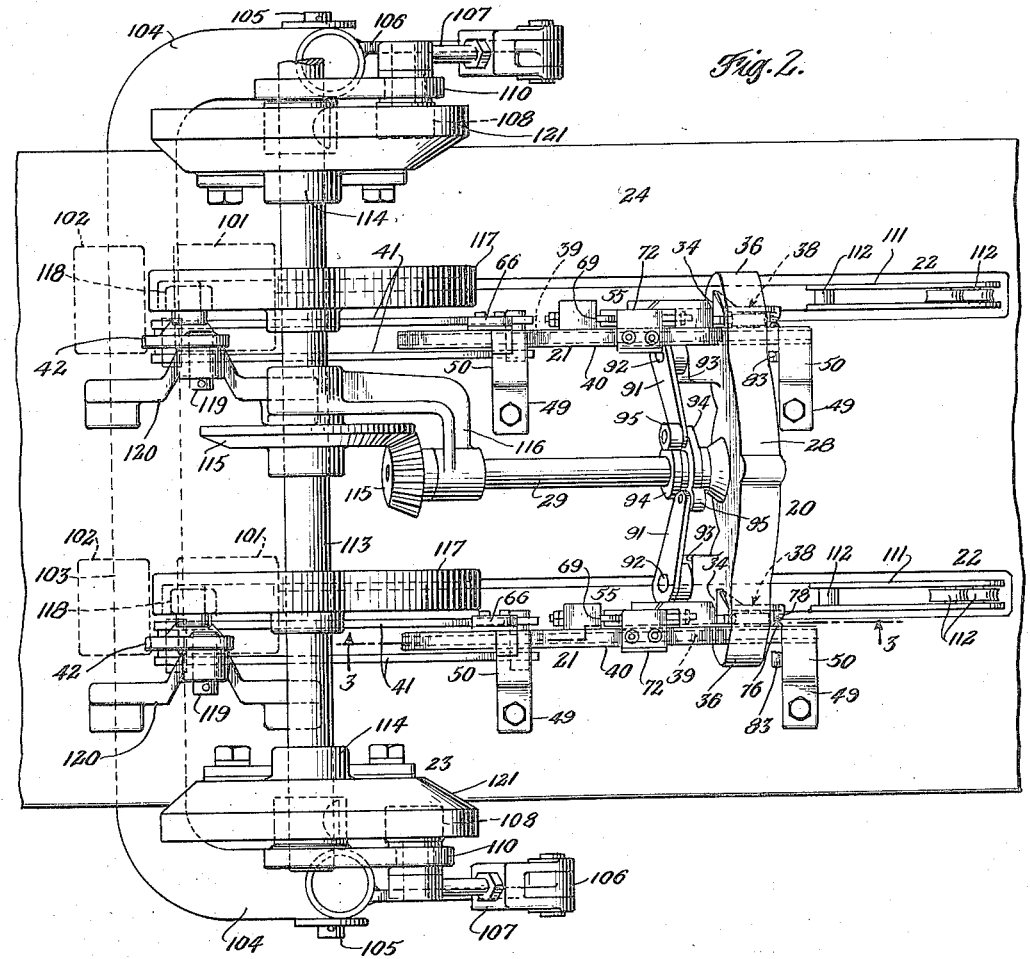
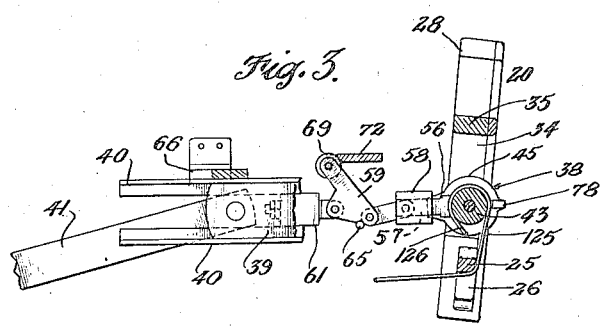
Inventor
George B. Hill
Richard E. Babcock Jr.
Attorney

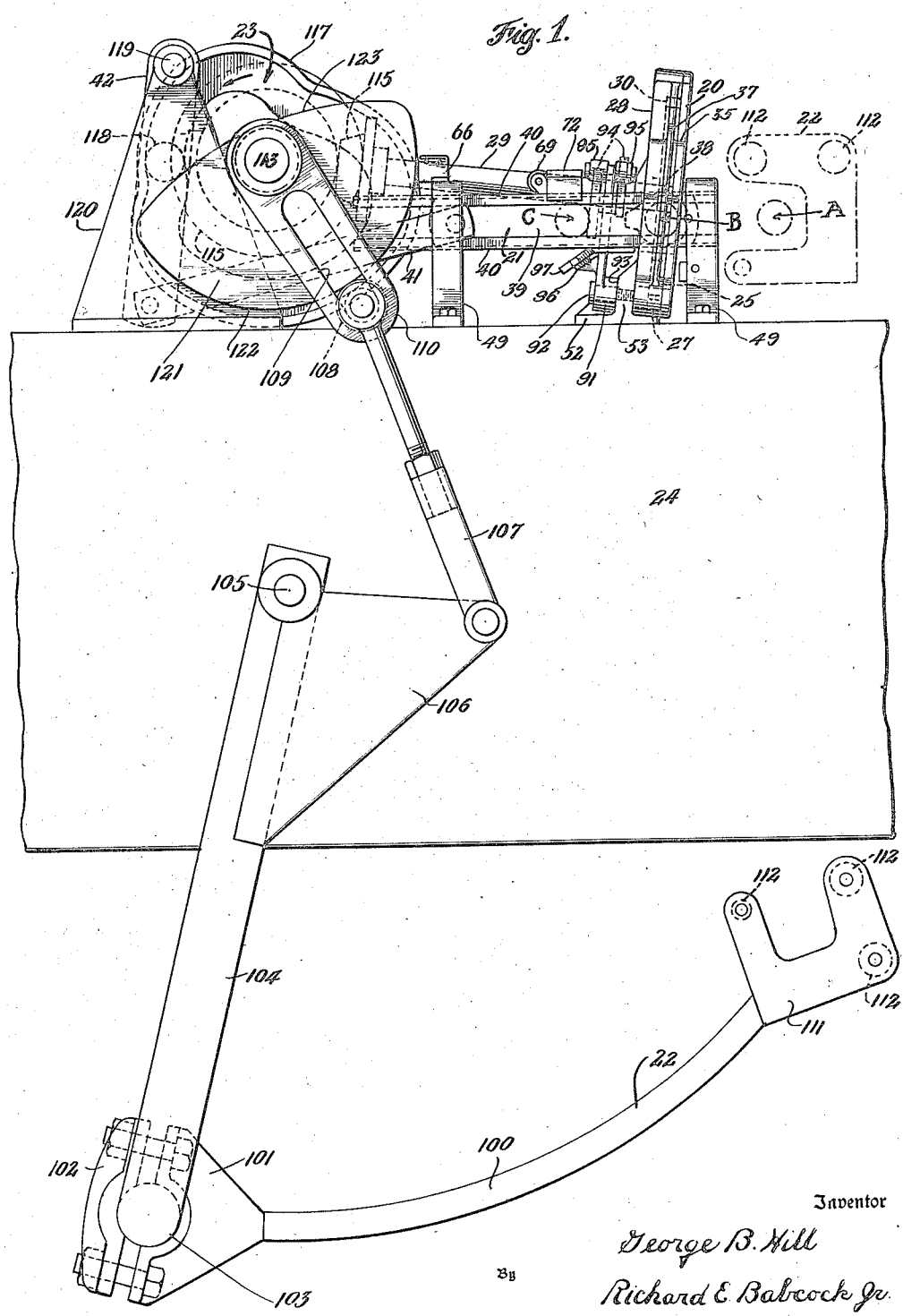

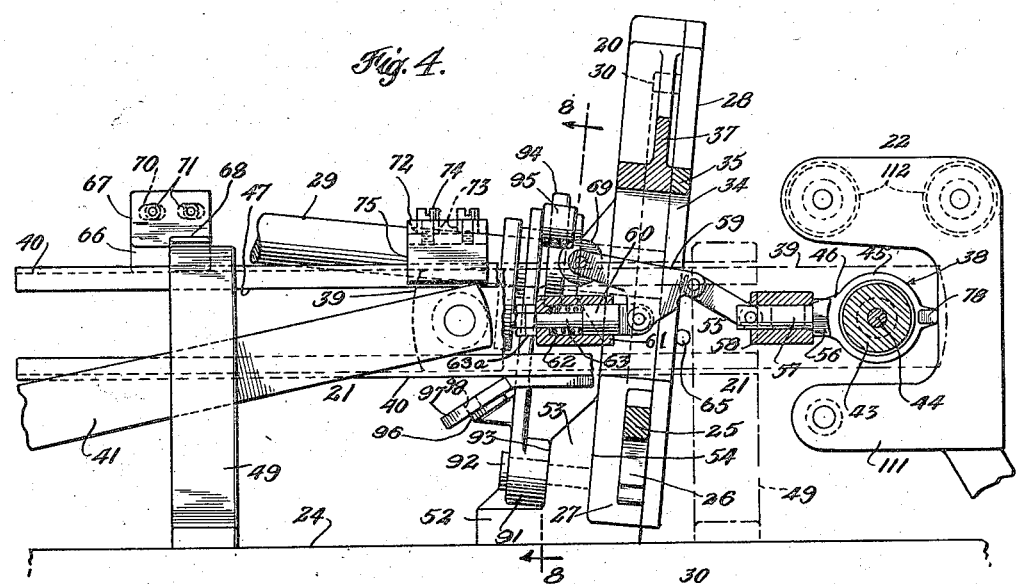

Nov. 11, 1958           G. B. HILL           2,859,687

AUTOMATIC WIRE TYING MECHANISM

Filed April 15, 1954           6 Sheets-Sheet 4

Inventor
George B. Hill
Richard E. Babcock, Jr.
By
Attorney

Nov. 11, 1958  G. B. HILL  2,859,687
AUTOMATIC WIRE TYING MECHANISM
Filed April 15, 1954  6 Sheets-Sheet 5
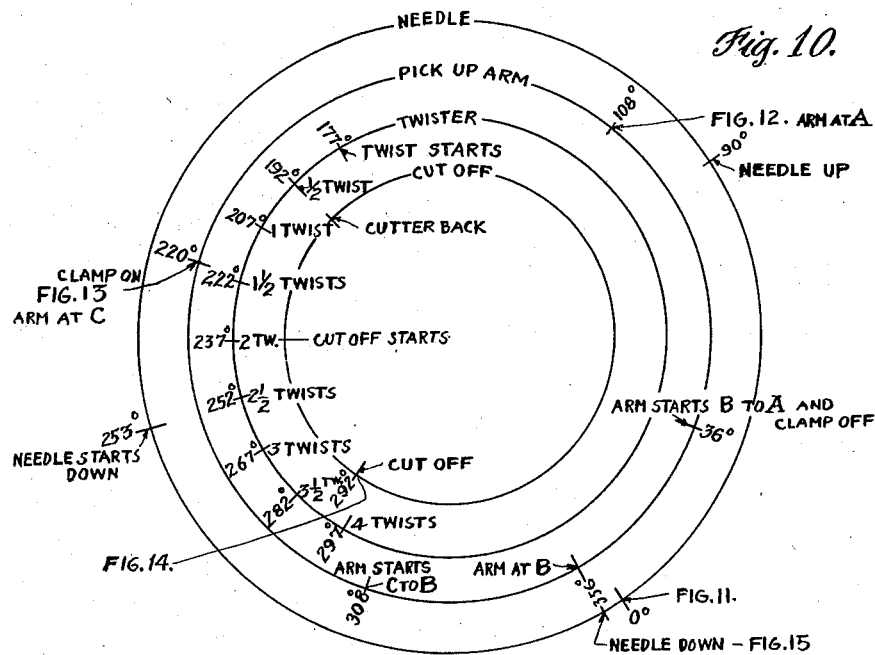
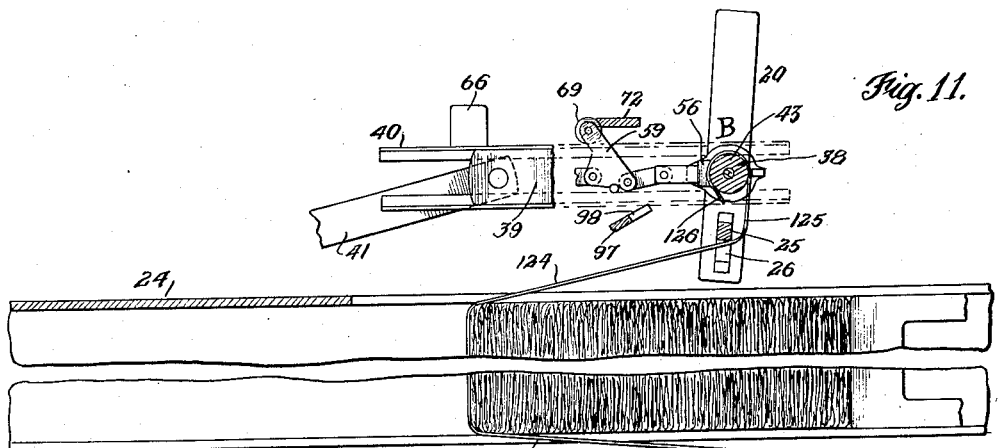
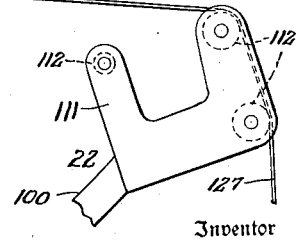
Inventor
George B. Hill
Richard E. Babcock Jr
By
Attorney Nov. 11, 1958      G. B. HILL      2,859,687
AUTOMATIC WIRE TYING MECHANISM
Filed April 15, 1954      6 Sheets-Sheet 6
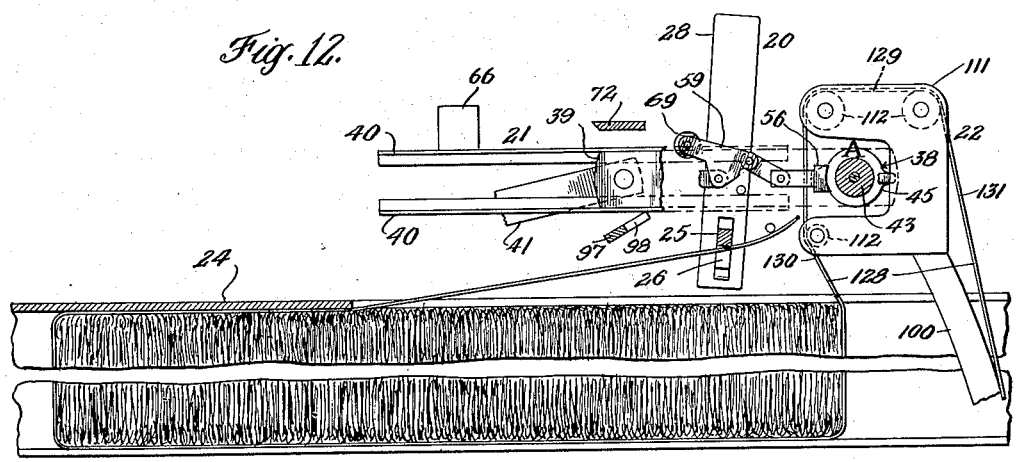
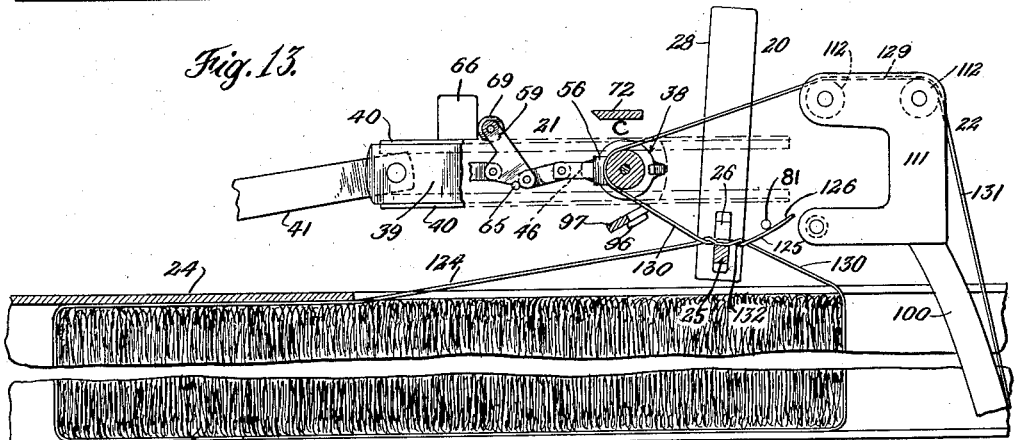
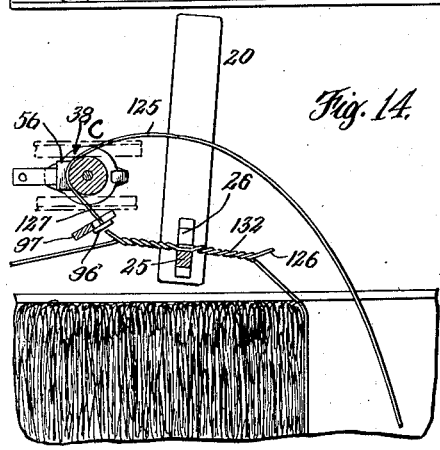
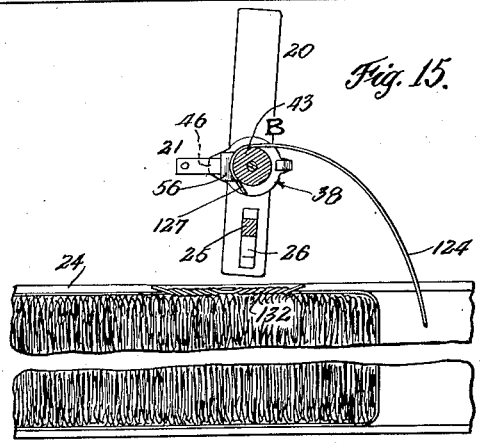
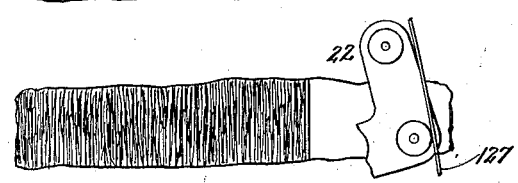
Inventor
George B. Hill
Richard E. Babcock Jr.
By      Attorney

United States Patent Office 2,859,687
Patented Nov. 11, 1958

2,859,687

AUTOMATIC WIRE TYING MECHANISM

George B. Hill, Celina, Ohio, assignor, by mesne assignments, to Sperry Rand Corporation, New Holland, Pa., a corporation of Delaware Application April 15, 1954, Serial No. 423,428

16 Claims. (Cl. 100—23)

This invention relates to improved wire tying mechanism for automatic balers. More particularly, it relates to such mechanism of the type generally exemplified in the United States patent to Kirshman No. 670,407 of March 19, 1901, in which the free end of wire bale tie extending across the bale chamber is held by a suitable gripper or holder located rearwardly of the wire twister so that a bale moving forwardly through the chamber will urge said free end into the twister, the other end of the bale tie being projected across the bale chamber by suitable needles or other mechanism, to be taken from the needle and laid into the twister on the side thereof remote from the bale chamber by means of a wire carrier movable in axially parallel relation to the twister on the opposite side thereof from the bale chamber.

It is the primary object of the instant invention to provide an improved simplified wire typing mechanism of this general type or class in which the stationary wire holding or gripping mechanism such as employed in the prior are is eliminated and its function is taken over by the carrier in addition to its function of laying one end of the wire tie in the twister.

The instant invention also involves a new and advantageous mode of operation in accordance with which the carrier is moved forwardly in the direction of bale motion past the twister to lay one side of a loop of wire therein, the loop then being severed by cutter mechanism located forwardly of the twister, the carrier then returning the free end of wire to the rearward side of the twister from which it may be laid into the twister from the bale chamber side thereof responsive to the movement of material through the bale chamber.

Also, it is an object to provide a simplified drive arrangement in which each of the major elements of the tying mechanism, that is, the carrier, the twister, and the needles are all directly connected to and driven from a common drive element which may be actuated as by means of a conventional one-revolution clutch to produce a tying cycle of the mechanism at proper times. Included in this drive is a novel driving connection between the needle mechanism and said drive element permitting a predetermined dwell of the needle at its delivery point despite continued revolution of the drive mechanism.

The foregoing, as well as other incidental features and advantages of the invention are all attained through the preferred embodiment of the invention illustrated in the accompanying drawings in which:

Fig. 1 is a side elevation of my invention as applied to the bale case of an automatic baling machine with all the parts of the mechanism shown at rest and in their starting positions;

Fig. 2 is a top plan view of the wire tying mechanism at large;

Fig. 3 is a longitudinal section on line 3—3 of Fig. 2 with certain parts broken away the more clearly to show the wire laying device in its relation to the wire tying device;

Fig. 4 is an enlarged fragmentary sectional elevation taken substantially on line 4—4 of Fig. 5 and showing the relationship between the wire laying device and the wire tying device at the time the wire laying device is coacting with the needle mechanism to engage the bale strand as presented by the needle mechanism;

Fig. 5 is an enlarged fragmentary sectional plan view of the several devices and the needle mechanisms in the relationship shown in Fig. 4;

Fig. 6 is a view similar to Fig. 4, but with the wire laying device in that position which it occupies with respect to the wire tying device and the needle mechanism after it has achieved the lay of the bale strand;

Fig. 10 is a diagram delineating the time cycle of the wire tying operation at large;

Figure 7:
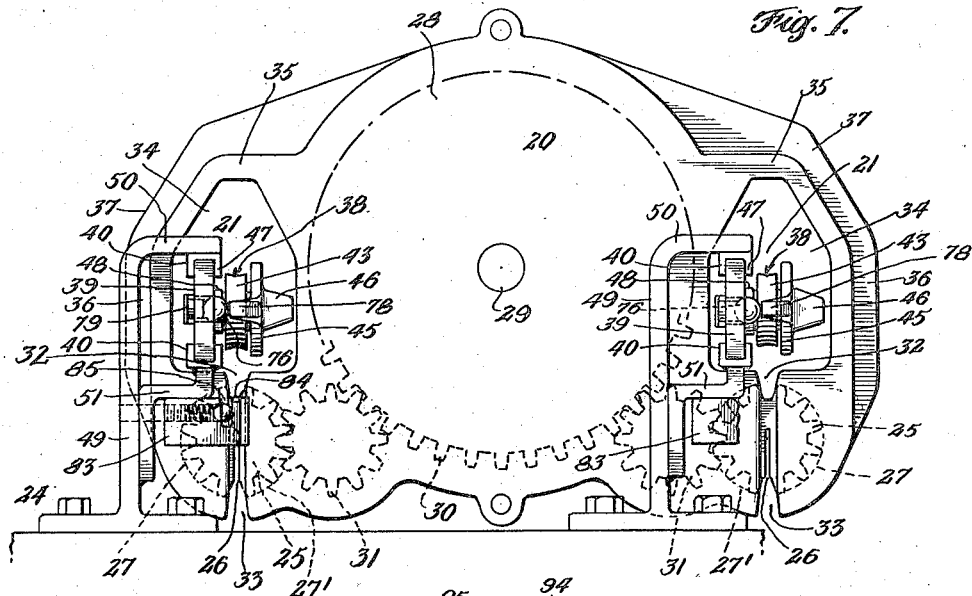
Fig. 7 is a front face view of the wire tying device.

Figs. 11 to 15 are diagrams depicting the operation of the mechanism at large at the various points in the tying cycle of Fig. 11 which are indicated by the application of references to the figures themselves, the various parts being shown in elevational outline in relation to the bale being formed or completed as the case may be, and the relation to the portions of the wire upon which they respectively operate, and the longitudinally extending central portion of the bale case and the bales illustrated being broken away in order to economize in the vertical space taken up by the several diagrammatic showings.

Referring now to Figs. 1 and 2 which are the most general views it will be seen that the wire tying device 20, the wire laying devices 21, the needle mechanism 22, and a primary timing mechanism 23 including a common actuating shaft 113 are all mounted upon the outer faces of the bale case 24. Wire tying device 20, and wire laying devices 21 are arranged in close association with the timing mechanism 23 on the top of the bale case, while the needle mechanism 22 is supported as usual from opposite side walls of the bale case. As clearly appears in the plan view of Fig. 2 the wire laying device 21 is provided in duplicate and the associated wire tying device 20 is provided with duplicate wire twisting gears (hereinafter to be referred to in detail), the former independently actuated from the timing mechanism 23. Thus it is that provision is made for making two wire ties around a bale equally distant from the vertical plane of symmetry of the bale. Inasmuch as the devices, mechanisms and parts thereof having to do with each of the ties about a bale are constructed similarly throughout, a description of but one train of them will suffice for a description of both, and the reference numerals will be duplicated sufficiently to make the application to both of them clear, especially in Fig. 2.

*The wire tying mechanism*

This mechanism which appears in outline in Figs. 1 and 2 and in various sectional showings in Figs. 4 to 6 is shown in front face elevation in Fig. 7. Its key elements are the wire twisting gears 25 which are provided with wire receiving slots 26 of a width but slightly greater than the diameter of the wire which, they are to tie, and which when the two strands of wire to be interconnected are laid in the slot near the axis of the gears, can be rotated several times to accomplish the necessary twist to constitute the wire tie. The nature of the tie clearly appears in Figs. 13 to 15, where it is shown as consisting of a number of twists between the strands of wire on opposite sides of the body of the gear 25 within the body of which the strands remain side by side and free from twists. This is a well-known form of tie.

The gears 25 are journaled for rotation in journal bearings 27 formed in a gear housing 28, within which they are driven from a power shaft 29 by means of a power gear 30 and the intermediary of idler pinions 31 in the well understood manner. Inasmuch as the construction of the tying gears 25 (or twisters as they are perhaps more often called) and their journaling, and the construction and journaling in the housing of the gears 30, 31 form no part of the present invention, further description is unnecessary, suffice it to say that journals adequate for the purpose and with appropriate tolerances and clearances are provided. Suffice it further to say that the housing 28 is an enclosed housing and that any of the well known expedients for placing and running gears in enclosed housings may be resorted to.

As appears very clearly in Fig. 7 the outer halves of the journals 27 for the gears 25 are divided in the vertical planes from the inner halves 27' of these journals, by upper and lower slots 32 and 33 respectively, which slots extend longitudinally through the housing 28, from the front face to the rear face. Moreover, the upper slots 32 communicate with large openings 34 in the housing, which openings likewise extend from front face to rear face, and through which the wire laying devices 21 operate. The heads of these wire laying devices appear clearly in Fig. 7. The outer halves of the journals 27 connect with the main body of the casing 28 only through integral housing shoulders 35 and depending arms 36. They are thus supported cantilever fashion from the upper portion of the housing 28. These arms 36 have an extended downward reach from the upper portion of the housing 28 and to give them strength a deep laterally projecting ribbing 37 is provided on their outer surfaces and is extended over the tops of the shoulders to the top of the housing.

Slots 32 and 33 are considerably wider than the diameter of the wire to be laid and tied. Normally slots 26 are opened downwardly in alignment with the centers of the lower slots 33 of the housing. Thus the free end strand of a wire tie can be drawn by a bale as it is built up and laid by this drawing action in the twister 25. When the twister 25 is rotated through 180 degrees to register with the upper slot 32 the associated wire laying device 21 which operates in the same vertical plane as the slots may lay a bale strand in slot 26 by way of slot 32 in the housing.

The wire laying device

Each wire laying device comprises a wire carrier 38 on the forward end of a horizontally arranged reciprocating bar 39 which is borne in channel guides 40 substantially parallel to the bale case and reciprocated therein by links 41 connecting with the depending cam lever 42 of the primary timing mechanism 23. The carrier 38 comprises a roller 43 which is journaled upon a pintle 44 projected laterally from bar 39 and bearing on its inner end a head 45 of a diameter somewhat greater than the maximum diameter of the roller 43, which head is provided on its rearward side with a forwardly and laterally extending wire deflector or projection 46. The roller 38 is properly grooved to receive and guide the wire which it may engage for the making of a lay. The deflector 46 is tapering in shape from its base on the head 45 and somewhat pointed, but outstandingly its forward face is tapered or inclined gradually toward and merges into the periphery of the head 45. The head 45 in its turn has the inner face of its periphery merged smoothly into the curvature of the surface of the roller 43 whereby a wire hooked on the forward side of the projection 46 is slid smoothly in toward the roller and over the periphery of the head 45 into the groove of the roller. An enlarged shank 48 on the pintle 44 or a washer equivalent spaces roller 38 sufficiently from the adjacent face of bar 39 to enable the roller adequately to clear the side walls 47 of the channels 40 in its reciprocation.

The guide channels 40 are supported from the bale case 24 in an elevated position by a pair of spaced pedestal members 49, the one immediately in front of the wire tying mechanism 20 and the other a distance to the rear thereof. These members are bolted by their bases to the top of the bale case as can be clearly seen in Fig. 7. Their upper ends are turned over at right angles as at 50 and the upper channel guides 40 are secured to the under sides of the turned portions. Welded to the lower faces are Z-shaped extensions 51 which support on the ends of their upwardly extending arms the lower of the two channel guides 40.

The wire tying device 20 is also supported directly from the top of the bale case 24 but by means independent of the pedestals 49 and the guides 40. Its support consists of a special pedestal 52 having a very broad base laterally and an upward extension 53 which makes an acute angle forwardly with the top of the bale case and the corresponding acute angle forwardly with guides 40 and the line of reciprocation of the wire laying device 21. The housing 28 of the wire tying device 20 is secured to the machined rear face 54 of the acute angled upward extension 53 in such manner that the plane of symmetry of its gears makes the same acute angle respectively with the bale case top and the line of reciprocation of the wire laying device. The precise nature and purpose of this forward inclination of wire tying device 20 will be disclosed later.

Wire holding devices

There are associated with the wire laying device 21 three different wire holding devices, two of them associated directly with the wire carrier 38 and a third associated indirectly with it. First there is the clamp type holder 55 (see specially Figs. 5, 6 and 4). This comprises a clamping head 56 having a curved front face adapted to clamp a bale strand engaged by the carrier 38 between its rear face and the curved periphery of the roller 43. The head 56 is borne on the end of a short sliding bar 57 of relatively small size mounted for longitudinal reciprocation in a block 58 secured to the face of slide 39 which mounts the carrier 38. Reciprocation of the clamping head 56 into and out of wire clamping position is brought about by an overthrow toggle 59 which extends between the front end of the mounting bar 57 and the rear end of a short slide bar 60 guided in a mounting block 61 also secured to the face of slide 39 in a forward position. The toggle 59 is spring pressed to its "off" and "on" positions by a spring 62 (Fig. 4) confined on the shank 63 of slide 60 which is of reduced diameter or size, and exerting its pressure between the main body of the slide 60 and the closed end of the block 61, the degree of throw being adjustably limited by a pair of jam nuts 63a threaded onto the end of the reduced shank 63 which end is projected outside of the closed end of the block 61. This adjustment defines the "off" position of the toggle 59. The "on" position is defined by the engagement of the underside of one branch of the toggle with a pin 65 projected from the face of the slide 39 of the wire laying device 21. Perhaps this should be defined as the extreme "on" position, for it is the intention to have the spring 62 press the clamp head 56 yieldingly firmly yet not immovably against the body of the wire strand about the roller 38. The pin is simply intended to limit the amount of over-center throw when the toggle is set in the "on" position.

Operation of the toggle 59 from the "off" position of clamp 56 which is depicted in Fig. 4 to the "on" position which is depicted in Fig. 6 is achieved through the engagement of a follower roller 69 attached to an upward extension of its forward arm with a stop plate 66 carried from the forward pedestal 49 supporting the wire laying device 21 through the intermediary of an angle plate 67, one arm of which 68 is welded as shown to the top arm of the pedestal 49. Such engagement is shown clearly in Fig. 6. The stop plate is adjustable longitudinally of the supporting bracket by means of the longitudinal slots 70 through which the securing bolts 71 are passed. Operation in the reverse direction to again place the clamp 56 in the "off" position shown in Fig. 4 is achieved by engagement of the roller 69 during movement of device 21 with a stop plate 72 having the adjustable bolt and slot connection 73, 74 with the upper arm of an angle member 75, in this case welded to the side of the upper of the channel guides 40 at a point intermediate the stop plate 66 and the wire tying device 20. This engagement is depicted outstandingly in Fig. 3. Comparing the constructions of the two stops and their mountings it will be observed that the stop plate 66 is so arranged that its lower portion depends vertically from its angular support 67, 68 and in the longitudinal vertical plane of the toggle roller 69 at such elevation that it engages roller 69 when the wire laying device 21 is substantially at the extreme of its forward stroke. On the other hand the stop plate 72 is arranged in such manner that it overhangs horizontally from its angular support 75 and so stands in the path of the roller 69 when it is elevated through movement of the toggle by stop 66 to its "on" position. When the roller 69 strikes the stop 72 as shown in Fig. 3, the roller is forced downwardly to open the toggle and then passes under the stop plate 72.

Figure 9:
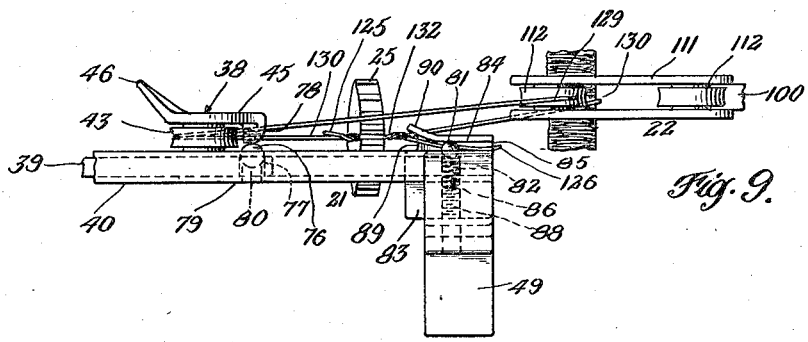
Fig. 9 is an enlarged plan view taken substantially on line 9—9 of Fig. 6 to show the detail and the relationships of two holding devices for the free end of the wire tie associated respectively with the wire laying device and with a stationary support.

The second and third of the holding devices are best shown in Fig. 9, though they appear in part in certain of Figs. 4 to 6. Referring to Fig. 9 the second of them will be seen to consist of a ball 76 located in a through running aperture 77 in the rear end of slide 39 of the wire laying device 21 and borne yieldingly against the projection 78 from the under side of the head 45 of the carrier 38 by means of a flat spring 79 secured to the side face of slide 39, and bearing against the ball 76 through a spring carried stud 80. The relative dimensions and arrangement of the parts is such that the projection 78 and the ball 76 contact each other a slight distance away from the adjacent faces of the guides 40 and in such position that a wire strand entering from the rear between the surface of the ball and the rear rounded surface of the projection 78 will slip between them and lodge in the groove of the roller 43 of the carrier 38. This wire holding device like the toggle operated clamping head 56 is directly associated with the carrier 38.

The third holding device is indirectly so associated. As clearly appears in Fig. 9 and in Fig. 7 it consists of a ball 81 in the bore or slot 82 of a block 83 secured to the under side of the horizontal main branch of the Z-shaped bracket 51 which supports the lower guide 40 and adapted to be borne against the inner face of an upwardly extending flange 84 on the overhanging margin of block 83. The bore 82 opens upon a slot 85 lying between the adjacent face of the guide 40 and the upwardly projecting flange 84 of the block 83, block 83 being vertically slotted for this purpose. Ball 81 is yieldingly borne against the inner face of the flange 84 by means of a spring 86 confined in the bore by a cap screw 88. The forward end of slot 85 is downwardly chamfered as at 89 and the forward end of the flange 84 is flared outwardly of the slot as at 90. This holding device is attached to the forward pedestal 49 between the wire tying device and the adjacent path of movement of the head 111 of the needle of mechanism 22. Slot 85 lies in the same vertical plane substantially as the point of engagement of the ball 76 and projection 78, while the flared end 90 of flange 84 is transected by the central vertical plane of roller 43 of the carrier 38. As a result it is feasible for the carrier 38 to place a wire strand which it carries first in contact with the flange 90 and then to carry it between the inner face of flange 84 and the ball 81 to a position rearwardly of the ball in which position it is yieldingly held. The vertical elevation of this third holding device as attached to the rear pedestal 49 is below the path of travel of the lower portions of the wire laying device 21 as clearly appears in Fig. 7, yet it has sufficient elevation to give ample angular spread vertically between a free end strand which it may hold and an associated bale strand to which the free end is to be tied.

The cutting mechanism

Figure 8:
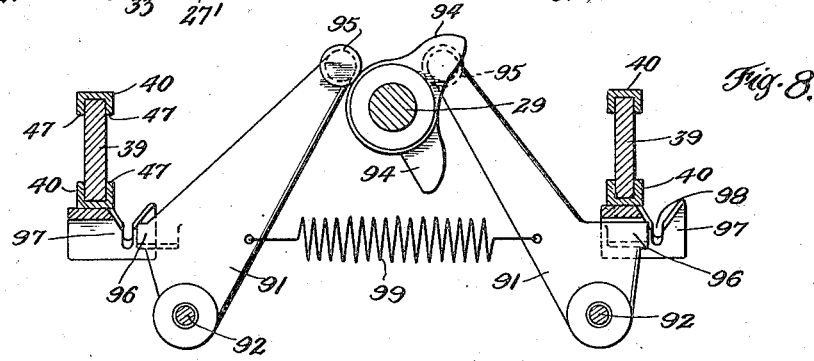
Fig. 8 is a front face view of the cutting device taken substantially on line 8—8 of Fig. 4.

The cutting mechanism shown in Fig. 8 in elevation appears in plan in Fig. 2 and in side elevation in Fig. 1 and each of Figs. 4 and 6. The rear elevation of Fig. 9 shows it to consist on each side of a cutting lever 91 fixedly pivoted at 92 to the forward face 93 (see Figs. 4 and 6) of pedestal block 52 which supports the wire tying mechanism 20, the plane of face 93 being parallel to the rear face 54 to which the wire tying mechanism 20 is secured. Levers 91 thus lie in planes parallel to the transverse inclined plane of the wire tying device 20 and operate in these planes. They are actuated by the engagement of cams 94 mounted on power shaft 29 of the wire tying device 20 with followers 95 mounted on the upper ends of the levers. The cams are angularly spaced apart to successively engage their followers and to successively cut the wires of the two ties which are achieved by the mechanism at large. The cutting edges 96 borne by the levers are, however, not in the same plane as the levers but are offset at an acute angle to occupy a plane extending downwardly and forwardly to contact the similarly extending plane under faces of anvil members 97 secured by welding to the under faces of the lower guides 40. The overhanging portions of the rearwardly and downwardly extending anvils are vertically slotted to receive a wire lay to be cut, and the upper edges of the slot are flared widely outwardly the more certainly to guide the wire into the narrow portion of the slot 98. Cutting edges 96 coact with the edges of the narrow portions of the slots 98 as usual to provide the shearing action for the cutting of the wire. Figs. 7 and 9 are drawn to the same scale and the axes and planes of corresponding parts are vertically superimposed. From this it will be apparent that the slots 98 lie in the same vertical plane as do gear slots 26 of the twister gears 25 and the pulleys 43 of the grippers 38. The result of this is that a bale strand borne from the under side of a gripper 38 on its forward stroke will be laid in one of the cutting slots 98 of the cutting mechanism of Fig. 8 following its laying in the wire twisting slots 26 of the associated twister gear 25 when the gripper 38 moves forwardly or to the left in Fig. 13. A cutter retracting spring 99 interconnects the two levers 91.

The needle mechanism

The needle mechanism at large appears principally in Fig. 1, though the heads of the two needles used appear in Fig. 2 in plan, while the head of a needle appears in each Fig. 4, and Fig. 5 in the position which it occupies at the extremity of its stroke above the top of the bale case. With the understanding that there are two needles 100 used, a description of what appears in these several views will be sufficient without further showing. The needles 100 consist of main bodies the bases 101 of which are bolted adjustably through yokes 102 about the bight 103 of the usual U-shaped yoke 104 the extremities of the arms of which are respectively oscillably mounted on studs 105 secured to the side walls of the bale case 24. Rearwardly extending triangular brackets 106 welded to the arms 104 connect through longitudinally adjustable links 107 with a needle actuating cam follower 108 borne slideably in slot 109 of needle actuating crank arm 110 of the primary timing mechanism 23. The body of the needle 100 is arc-shaped on a radius centered on the studs 105 of the yoke 104. The heads of the needles are comprised of a U-shaped double walled sheet metal frame 111, the opening between the arms of which extends upwardly and forwardly in such relation to the body of the needle as to occupy a substantially horizontal position when the needle is at its upper extremity of movement and the head 111 is immediately opposite the wire laying device 21. Head 111 is secured to the body of the needle at its rear lower corner. At the extremity of each arm and at the rear upper corner of the U are located wire engaging rollers 112 carried on pintles between the walls of the sheet metal structure. These rollers are located in right angular relation to each other as clearly appears in several of the views, the arrangement being such that a wire loop carried through the casing by the needles has a bight portion 129 extending substantially horizontally from roller to roller of the upper of the U arms, and a vertical bale strand portion 130 extending vertically from the roller on the upper arm past the roller on the lower arm. The vertical plane of the rollers in this case transects the laterally and forwardly extending wire deflector or projection 46 of the carrier 38. Thus the carrier 38 when reciprocated rearwardly to the position shown in Fig. 5 slips the projection 46 past the vertically extended portion of the bale loop, and on its forward stroke hooks that portion of the needle loop over into the groove of its roller 43 and carries it forwardly in its wire laying operation.

The timing mechanism

The timing mechanism 23 provides the power for actuating the various mechanisms and devices already described and the means for relatively timing them with accuracy. Referring especially to Figs. 1 and 2 this mechanism comprises a timing shaft 113 which according to the invention is characterized by its being driven by any means desired through but one revolution at a time, being started at the beginning of the revolution and stopped at the completion. One revolution and stop clutches are commonly used in the art for this purpose and are commonly controlled in their starting from bale metering wheels. They are stopped by their own mechanism. The constructions are so common that it is not deemed necessary to show it in this connection. Shaft 113 may be supported from the top of the bale case 24 through any suitable pedestal bearings such as 114 associated with cams 121.

Wire tying device 20 is driven from this shaft through its own power shaft 29 which makes connection with shaft 113 through beveled gears 115. Angled bearing bracket 116 commonly journals both shafts in such manner as to give the respective axes position in a common plane. Bevel gears 115 are of the intermittent type, that is to say gear 115 on shaft 113 is provided with teeth on but a portion of its periphery as indicated whereby to drive the small gear 115 on shaft 29 during but a portion of the revolution of shaft 113 whereupon shaft 29 comes to rest. This is a well known type of gear and its details need not be shown. Shaft 29 is, of course, locked in its rest position against rotation by other means than the gear 115.

Wire laying devices 21 are operated from shaft 113 by the engagement of the slotted cams 117 fixed on shaft 113, with the follower rollers 118 borne by the oscillating cam levers 42 which have already been described as connected by means of links 41 with the slides 39 of the wire laying devices 21. Links 42 are suspended by their pivots 119 from the upper ends of pedestals 120 which rise from the top of the bale case. Note that links 41 are dual while cam levers 42 are single and slides 39 are single, the links 41 flanking them and being connected with them through pivots. Note also that pivot 119 is offset on one side of the levers 42 while the followers 118 are offset on the opposite side.

The needle mechanism 22 is driven from the opposite ends of the shaft 113 by means of the slotted arms 110 which are keyed to the opposite ends of the shaft 113. In this drive the followers 108 are moved about the periphery of fixed cams 121 emanating from the periphery of the bearing pedestals 114. The outermost portions 122 of this periphery are arcuate about the center of shaft 113 and the length of slot 109 is such that the follower 108 is supported against this arcuate periphery during the traverse of the arm 110 through its angular extent in the direction of the arrow. When, however, the arm 110 leaves the arcuate portion, cam follower 108 is borne by gravity onto the upper and less remote portion 123 of the periphery of the cam and recedes in slot 109 radially downwardly and inwardly toward the axis of shaft 113 until it nears the radially innermost portion of the slot 109 whereupon it again passes radially outwardly along the slot until it once again travels the arcuate periphery.

By providing one of these cam drives for the needle mechanism on each end of the shaft 113 symmetrical application of power to opposite ends of the yoke 104 and freedom of the yoke from twisting is attained.

Operation

Coming now to the overall operation of the tying mechanism, it is believed that this is clearly shown diagrammatically in Figures 11 to 15 of the drawings which respectively show successive operational positions of the various elements of the mechanism during a tying cycle, and in Figure 10, which diagrammatically delineates the time cycle of the wire tying operation and indicates the relative positions of the various major elements of the mechanisms at successive rotational positions of their common control or actuating shaft 113.

Figure 11 shows the several parts in their positions which they occupy following completion of a bale within the bale chamber just prior to initiation of the tying cycle, the actuating shaft 113 at this time being in its position of rest, shown as 0 degrees on the diagram in Fig. 10. At this time the free end 126 of wire 124 will have been laid into twister 25 from therebeneath by pressure of the forwardly moving bale. As soon as the shaft 113 commences to rotate in the direction indicated by the arrow in Fig. 1 to initiate the tying cycle, the ensuing movement of the follower roller 108 over the cam surface 122 as caused by the crank arms 109 acts through the pitmans or links 107 and yoke 104 to commence upward swinging movement of the needles 22. At the same time the coaction between the cams 114, followers 118, arms 42, and links 41, institutes movement of the wire carriers 38 from their positions B of Figure 11 toward the position A of Fig. 12. At the inception of such movement it will be seen that coaction between the roller 69 on toggle arm 59 and the abutment 72 will swing the toggle arm 59 to release or retract clamp 56 from the roller 43, to thus release the free end of wire held between these elements as shown in Fig. 11. Also, incident to this same movement the free end will have been caught beneath the ball detent 81 to be thereby held out of the path of the carrier 43 during its subsequent movement. When in position A the carrier 43 is at the extremity of its reciprocating movement in the one direction and about to commence its forward return movement. By reference to Fig. 10, it will be seen that the needles 22 will have reached the position of Fig. 12 at the end of 90 degrees revolution of the shaft 113 to await the subsequent arrival of the carrier 43 to the position of Fig. 12 in readiness to pick up the wire from the needle 22.

At the time the needle arrives at position A in Fig. 12, the cam follower or roller 108 will have commenced to ride over the cam surface 123 to thereby let the needle dwell in substantially this position during the next ensuing portion of the tying cycle. The cam 114 then acts to retract the carrier 38 forwardly, and during such retraction the gears 115 cooperate to institute rotation of the wire twister, the retraction movement of the carrier being so timed with the twister movement as to lay the lower strand 130 of the wire in the slot of the rotating twister 25 at the end of the first half revolution thereof.

As the shaft 113 continues to rotate, it will be seen that the carrier will retract the wire strand 130 so as to lay it in the cutter 96—97 as in Fig. 13, while simultaneously the roller 69 on toggle arm 59 will engage abutment 66 and thereby swing toggle arm 59 to project clamp element 56 into gripping engagement with the wire loops passing around the roller 43. It will be seen at this time that the twister has rotated one and one-half times and will thus have partially completed the twist in the adjoining wire strands. Thereafter, as retraction of the carrier 38 continues toward the position depicted in Fig. 14, the cutting elements or cutter 96—97 is brought into operation to sever the wire between the twister 25 and carrier 38 as the twist is completed.

In Fig. 14, the parts are shown in the relative positions which they occupy at the time the cutter 96—97 completes the severing of the wire to leave a new free end 127 clamped or gripped in the carrier. In the position shown in Fig. 14 the carrier 38 is just approaching the end of its reciprocation to the left in that figure and is ready to commence moving back toward the right to its starting point as shown by the letter B in Fig. 15. It will be seen that shortly after the clamp is actuated as shown in Fig. 13, the needle 111 will have commenced its downward or retraction movement so that the new free end 127 will be left completely under the control of the carrier 38.

In Fig. 14, the twister 25 is shown having completed three and one-half revolutions. It will be understood that the coaction between the twister drive gears 115 is such as to discontinue rotation of the twister at the end of four revolutions leaving its slot 26 opening toward the bale case 24 as in Fig. 15 whereby the completed twist or tie 132 will be stripped from the twister due to tension of the completed bale tie. At the completion of the tying operation shown in Fig. 15, the carrier will be at rest in a position wherein its projects longitudinally past the twister 25 to a longitudinal location between the twister 25 and the delivery point of the needle 111 to thus hold the new free end 127 so that the wire strand 124 depending therefrom across the bale casing will be held out of engagement with the side of said twister 25 remote from the bale casing and positioned for movement into the downwardly directed twister slot 6 by the formation of a new bale there against as shown in Fig. 15, following which the parts will be positioned to commence a new tying cycle.

In this application I have shown and described only the preferred embodiment of my invention simply by way of illustrating the preferred mode contemplated by me of carrying out the invention. However, I recognize that various changes may be made in the illustrated construction without departing from my invention. Accordingly, the drawings and description herein are to be considered illustrative in nature and not as exclusive.

Having thus described my invention, I claim:

1. A wire tie mechanism for a baler of the type in which a needle on one side of a bale case projects a loop of wire across the bale case around the rear end of a completed bale for reception in a wire twister on the other side of said bale case, comprising a twister rotatably supported on said other side of said bale case having a wire receiving slot normally opening inwardly toward said bale case, a wire carrier disposed for movement longitudinally of the bale case on the outer side of the twister from the bale case, said wire carrier when at rest being disposed to project longitudinally between said twister and the point of delivery of said needle, releaseable clamp means associated with said wire carrier for holding the free end of a wire bale tie extending across said bale case, whereby a bale moving forwardly through the same case will carry said wire bale tie into said twister slot, means operative upon completion of a bale for projecting said needle across the bale case, means coordinated with said needle projecting means for projecting said carrier rearwardly to take the loop of wire from the needle and then retract it to lay one side of the loop in the twister, means for actuating said clamp means to release said free end during said rearward movement and to thereafter operatively engage said loop during its retraction movement, means for cutting said wire between the twister and the clamp means during said retraction movement to leave a new free end of wire in the clamp means, said carrier projecting means returning the carrier to its original position to hold said free end in a position for operative reception in the twister incident to formation of the next succeeding bale.

2. In a wire tie mechanism for a baler of the type in which bales are successively formed in and discharged forwardly through a bale chamber, a needle on one side of the bale chamber for projecting a loop of wire across said chamber, a twister on the other side of said chamber, means on said twister for receiving said loop of wire, the combination of a wire carrier reciprocable longitudinally of said chamber on the outer side of the twister from the bale chamber, said carrier normally lying at rest intermediate the extremities of its reciprocation at a location wherein it projects longitudinally between the twister and the path of movement of said needle, a releaseable clamp associated with said carrier and operable when the carrier is at rest to hold the free end of a wire extending across said bale chamber for movement forwardly into the receiving means on said twister from the side thereof adjacent said bale chamber responsive to the movement of a bale through said chamber, means operating said twister, needle, clamp and carrier in coordinated relation to release said clamp, move said carrier rearwardly to take the loop of wire from said needle, then move the carrier forwardly to lay one side of said loop in the receiving means on the twister from the side thereof remote from said bale chamber.

3. The combination of claim 2 in which means are provided for cutting said wire between the twister and the carrier to leave a new free end of wire in the carrier, said carrier then returning to its starting position to hold said free end in position for movement into the twister from the side thereof adjacent the bale chamber as an incident to bale movement.

4. Wire tie mechanism for balers comprising a wire twister rotatable about a fixed axis, a wire cutter adjacent one axial end of said twister, means for delivering a loop of wire to a delivery point adjacent the other axial end of said twister, a wire carrier reciprocable between said delivery point and said cutter at one radial side of said twister, said carrier normally being at rest in a position wherein it projects longitudinally between said twister and the said delivery point so that a free end of wire extending across a bale from the carrier will be held out of the adjacent axial side of the twister for movement into the twister by means independent of said carrier from the radial side of the twister remote from said carrier, means operative to cause one complete reciprocation of the carrier during each tying cycle, said operative means moving the carrier first toward the delivery point to pick up a loop of wire, then back past said twister and said cutter for operative positioning of the wire in each from the side adjacent said carrier, said operative means then returning the carrier to its starting point.

5. The combination of claim 4 in which said carrier includes a releaseable wire clamp supported thereon, means operating to release a free end of wire held in said clamp during movement of the carrier from its position of rest to the delivery point and to actuate said clamp responsively to its subsequent movement toward the cutter, whereby said clamp will grip said loop of wire, and means for operating said cutter to sever said loop between the twister and the carrier to leave a new free end of wire held by said clamp, the clamp then continuing to hold said free end following return of the carrier to starting position and during the formation of a new bale.

6. Wire tie mechanism for a baler comprising a slotted wire twister rotatable about a fixed axis, a housing rotatably supporting said twister and having a through slot permitting laying of wires into said twister from opposite sides of the twister axis, a wire cutter in the plane of said through slot adjacent one axial end of the twister, means for delivering a loop of wire to a delivery point adjacent to the other axial end of said twister, a wire carrier reciprocable axially past said twister adjacent one radial end and in the plane of said through slot to take a loop of wire from said delivery point and lay one side of said loop into said twister through said one end of the through slot and also into said cutter, means for actuating said cutter to sever said wire between the twister and the carrier, the carrier coming to rest at the end of each reciprocation in a position wherein it projects longitudinally between the twister and the said delivery point to hold a free end of wire clear of said twister at said one end of the through slot as said wire is moved into said twister from the other end of said through slot by means independent of the carrier.

7. The combination defined in claim 6 including means for constantly rotating said twister during reciprocation of the carrier.

8. Wire tie mechanism for a baler comprising a slotted wire twister rotatable about a fixed axis, a wire cutter adjacent one axial end of the twister, means for delivering a loop of wire to a delivery point adjacent the other axial end of said twister, a wire carrier reciprocable axially past one radial end of said twister to take a loop of wire from said delivery point and lay one side of said loop into said twister and into said cutter, means for actuating said cutter to sever the wire between the twister and the carrier, the carrier coming to rest at the end of each reciprocation in a position wherein it projects longitudinally to a location between the twister and said delivery point to hold a free end of wire clear of said one radial end of said twister whereby the strand of wire extending from said free end across the axis of said twister may be laid into said twister on the side thereof remote from said one radial end by means independent of said carrier.

9. Wire tie mechanism for a baler comprising a slotted wire twister rotatable about a fixed axis, a housing rotatably supporting said twister and having a through slot permitting laying of wires into said twister from opposite sides of the twister axis, means for delivering a loop of wire to a delivery point adjacent one axial end of the twister, a wire carrier reciprocable axially past one radial end of said twister adjacent one end of said through slot and in the plane of said slot to take a loop of wire from said delivery point and lay one side of said loop into the twister, means being provided for severing the wire between the twister and the carrier to leave a free end of wire in the carrier, the carrier coming to rest at the end of each reciprocation in a position wherein it projects longitudinally to a location between the twister and the said delivery point to hold the free end of wire clear of said one radial end of said twister while the strand of wire extending from said free end is laid into said twister from the radial end thereof remote from said one radial end.

10. Wire tie mechanism for a baler comprising a wire twister rotatable about a fixed axis and having a radial wire receiving slot opening through its periphery, the twister normally being at rest with the mouth of said slot opening in a predetermined direction, means for delivering a loop of wire adjacent one axial end of said twister, a wire carrier, wire holding means on said carrier, said carrier being reciprocable past said twister in an axial plane thereof on the radial side of said twister remote from the mouth of said slot, said carrier normally lying at rest in a position projecting longitudinally between the twister and the said delivery point and holding the free end of wire free of the periphery of said stationary twister while said wire is moved into the slot from the opposite side of the twister by means independent of the carrier.

11. The combination of claim 10 in which means are provided for simultaneously rotating said twister and reciprocating said carrier to cause said carrier to take a loop of wire from said delivery point and bring one side of the loop to the twister for reception in the slot of the rotating twister and along side of a previously laid free end after the twister has rotated through approximately 180 degrees from its point of rest.

12. The combination defined in claim 11 wherein means are provided for severing said one side of the loop of wire between the twister and the carrier to leave a new free end of wire in the carrier.

13. The combination of claim 12 in which there is mechanism associated with said holding means for causing same to release said free end as the carrier moves toward the delivery point to pick up said loop.

14. Wire tie mechanism for a baler comprising a slotted twister rotatable about a fixed axis, means for supporting a loop of wire at a location adjacent an axial end of said twister, a carrier reciprocable axially past said twister on one diametrical side thereof for taking said loop of wire from the delivery point and laying one side of the loop in said twister, means for cutting the wire loop between the twister and carrier to leave a free end of wire in the carrier, means supported by the carrier for gripping said free end, and means for returning the carrier to a predetermined position of rest in which the said free end extends between said twister and the said location.

15. The combination of claim 2 wherein said means operating the twister, needle and carrier in coordinated relation comprises a common driving shaft and means directly connecting said shaft in driving relation to each of the said elements.

16. The combination of claim 15 wherein said direct connection between the actuating shaft and the needle and carrier respectively comprises cam controlled linkages.

References Cited in the file of this patent

UNITED STATES PATENTS

| | | |
|---|---|---|
| 1,040,278 | Collins | Oct. 8, 1912 |
| 1,213,993 | Zachow | Jan. 30, 1917 |
| 2,355,644 | Haase | Aug. 15, 1944 |
| 2,355,647 | Haase | Aug. 15, 1944 |
| 2,512,896 | Hill et al. | June 27, 1950 |
| 2,593,653 | Bornzin | Apr. 22, 1952 |